Nov. 17, 1942.  W. F. ALLER  2,302,088
GAUGING DEVICE
Filed Aug. 27, 1940  3 Sheets-Sheet 3
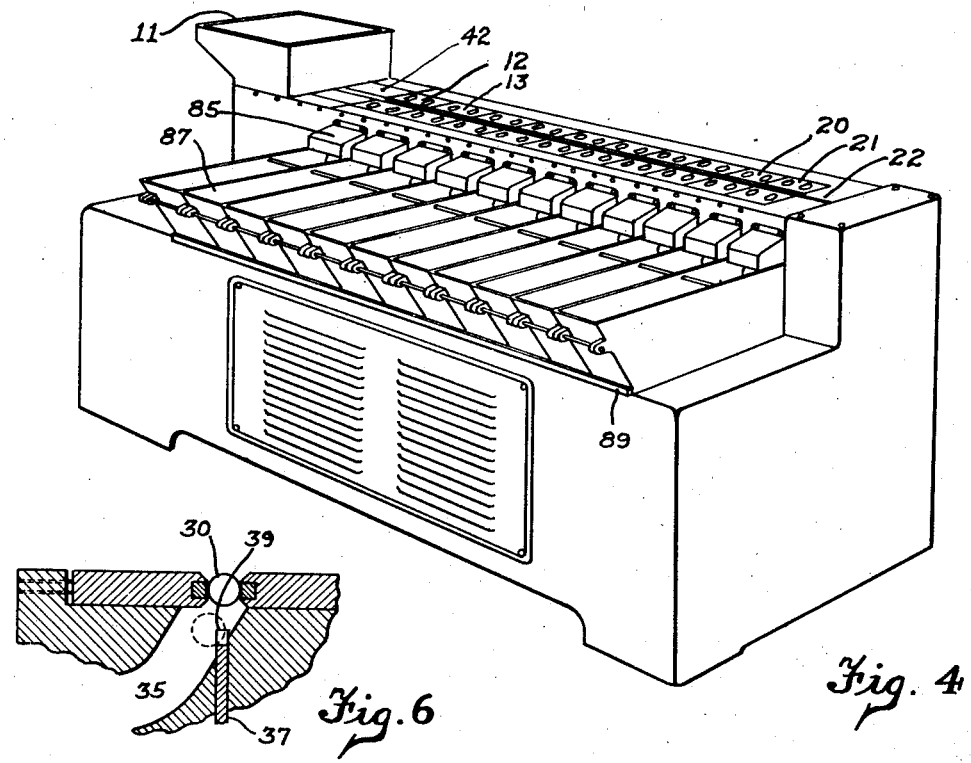
Fig. 4
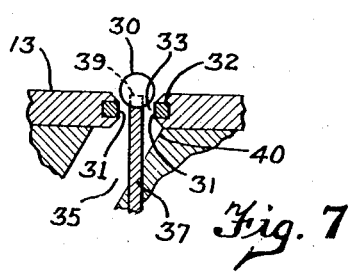
Fig. 6
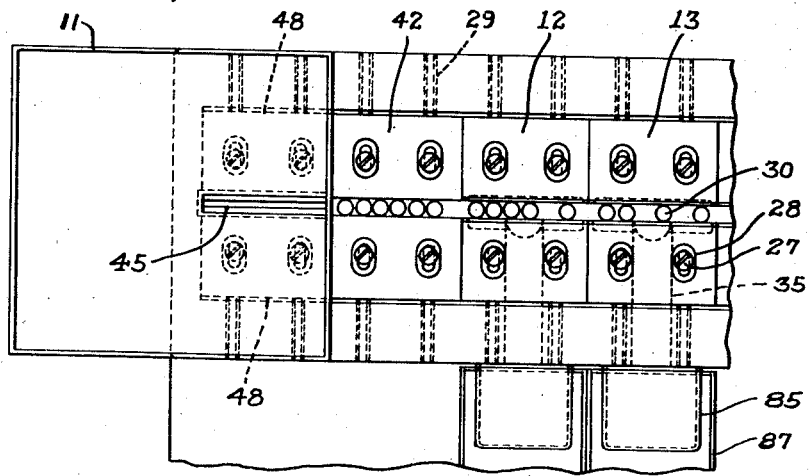
Fig. 5
Fig. 7
Inventor
Willis Fay Aller
By Marechal & Noe
Attorneys Patented Nov. 17, 1942

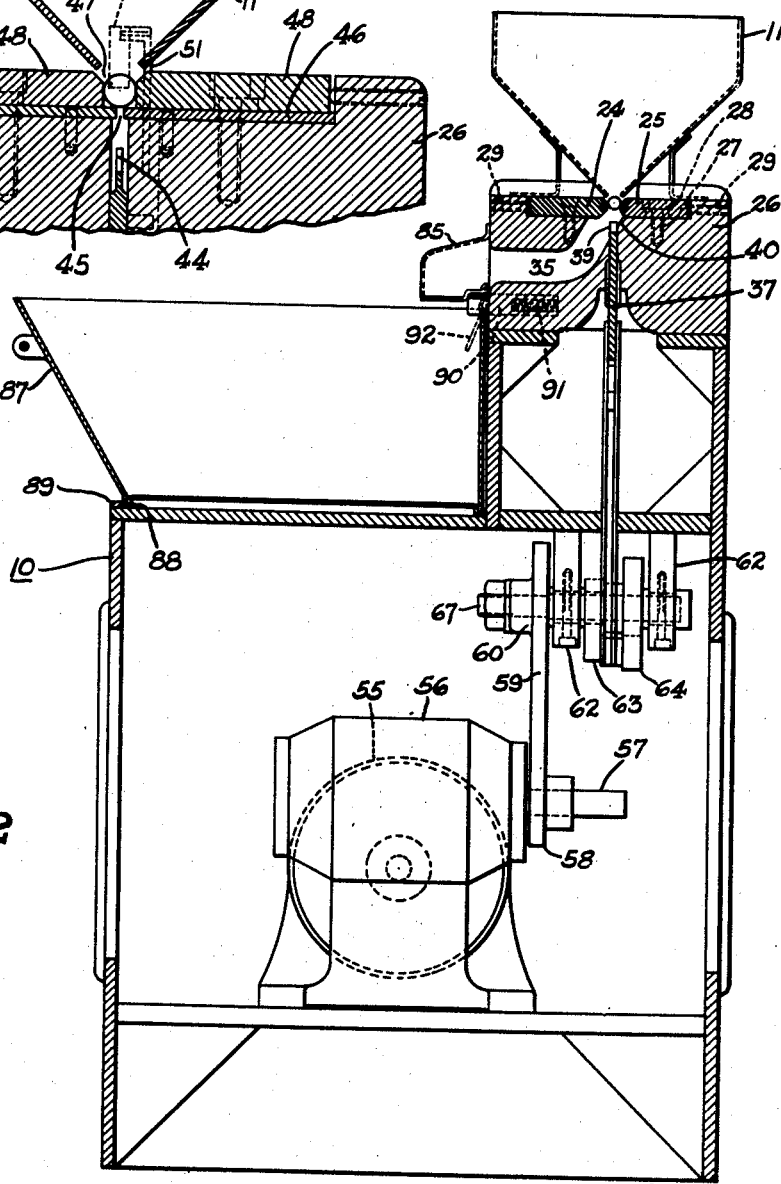

2,302,088

UNITED STATES PATENT OFFICE 2,302,088

GAUGING DEVICE

Willis Fay Aller, Dayton, Ohio, assignor to The Sheffield Corporation, Dayton, Ohio, a corporation of Ohio Application August 27, 1940, Serial No. 354,410

11 Claims. (Cl. 209—99)

This invention relates to gauging and sorting apparatus for sorting articles according to size.

One object of the invention is the provision of a gauging and sorting apparatus of simple construction for sorting articles according to size and adapted to sort the articles accurately and rapidly.

Another object of the invention is the provision of a sorting apparatus providing a plurality of gauge devices having passages, each of a uniform width and a length to simultaneously receive a row of the articles to be sorted, the articles being advanced, in groups or rows from one gauge device to a succeeding gauge device so that a number of articles are simultaneously sorted in each of the gauge devices.

Another object of the invention is the provision of a gauging and sorting apparatus in which a row of the articles to be sorted is advanced to the first gauge device and then to succeeding gauge devices, the construction being such as to eliminate inaccuracies due to wear.

Another object of the invention is the provision of gauging and sorting apparatus, including a series of gauge devices each having a passage of uniform width to which the articles to be sorted are advanced, and through which articles of a predetermined size may pass to receiving channels and then to receivers or pans individual to the gauge devices, each of the channels having a door which retains the articles in the channel when its respective receiver or pan, which is normally placed adjacent the end of the channel, is removed.

Other objects and advantages of the invention will be apparent from the following description, the appended claims, and the accompanying drawings, in which—

Fig. 2 is a vertical section through the machine taken on the line 2—2 of Fig. 1;

Fig. 3 is a vertical section on the line 3—3 of Fig. 1, through the hopper;

Fig. 4 is a perspective view of the sorting machine;

Fig. 5 is a top plan view of a portion of the machine;

Fig. 6 is a sectional view of one of the gauge devices, corresponding to Fig. 2 but on a larger scale; and Fig. 7 is a view corresponding to Fig. 6 but showing the position of the parts when the advancing means is raised.

Figure 1:
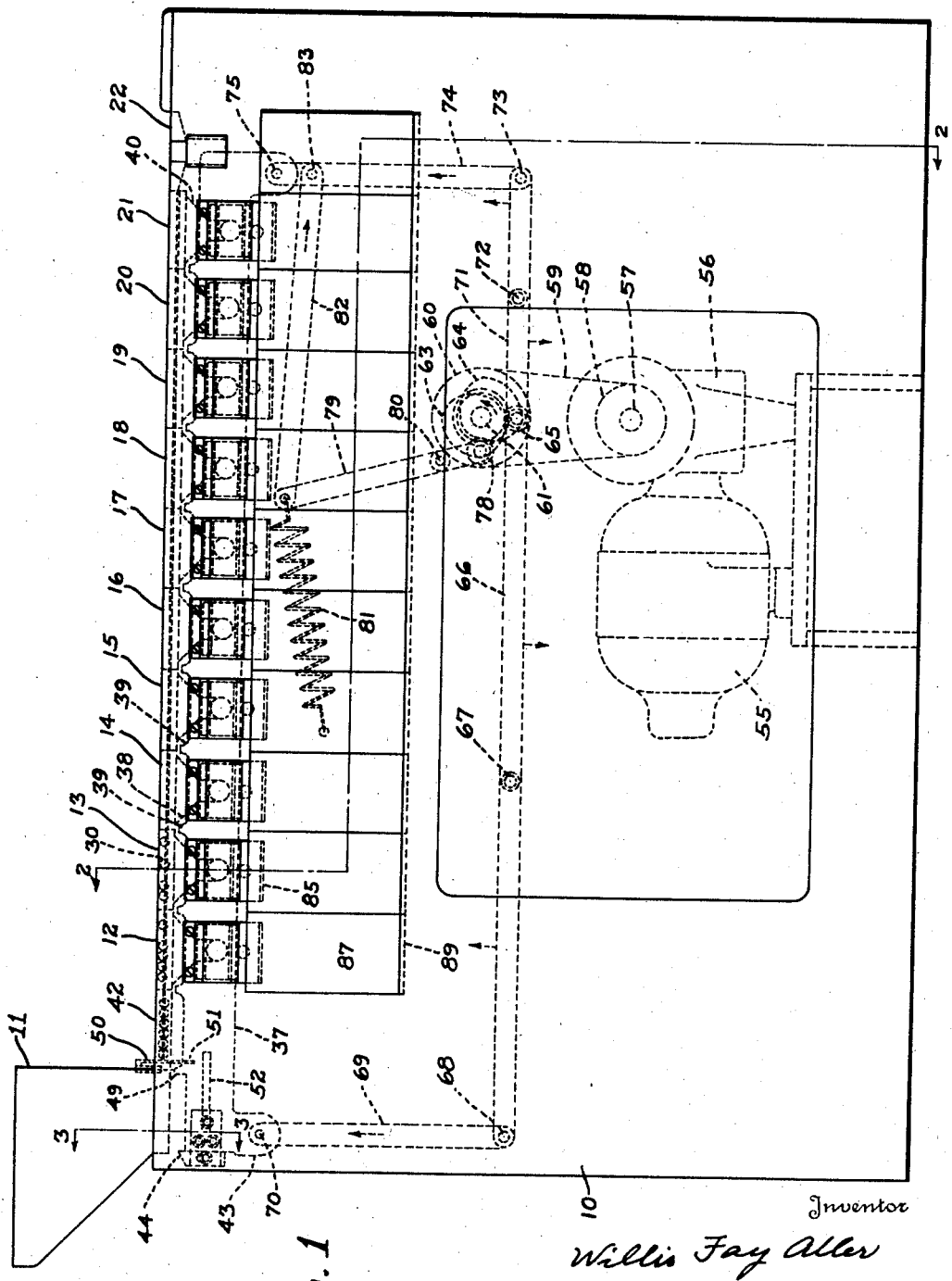
Fig. 1 is a side elevation of a sorting machine embodying the present invention.

Referring more particularly to the drawings, in which the preferred embodiment of the invention has been shown as a gauging and sorting machine for ball bearings or other articles, 10 generally designates a supporting structure on which is a holder or hopper 11 adapted to contain a large number of the articles 30 to be gauged and sorted. These articles, in accordance with the present invention, are supplied in groups or rows from the holder 11 to a series of gauge devices 12 to 21 inclusive, the gauge devices having passages each of uniform width but with the passage widths in the successive gauge devices successively increasing, the articles that are of a size less than the passage width in any gauge device passing through the gauge passage to a suitable receiver, while those articles that are too large to pass through any gauge device are lifted from that gauge device and moved along to a succeeding gauge device. Those articles that are too large to pass through any gauge passage will finally be moved along to a station 22 at the end of the series and be segregated from the others.

The several gauge devices are similar in construction, except for the difference in the widths of the passages. The gauge device 13, for example, and as shown more particularly in Figs. 1, 2, 5, 6, and 7, comprises a pair of spaced blocks or bars 24 and 25 adjustably carried for variation of the gauge passage width, and the table portion 26 of the supporting structure. The bars 24 and 25 are secured in adjusted position by means of screws 27 threaded in the table portion 26 and arranged in slots 28 in the gauge bars, these slots permitting adjusting movement of the gauge bars towards or away from one another when the screws are loosened. The bars may be positioned by hand, or by means of screws 29 threaded in the table portion 26 and accessible in the side portions of the machine so they may be turned in one direction or the other and thus provide adjustable stop surfaces engageable with the outer sides of the bars. Each bar has a vertical gauging surface 31 extending parallel to the adjacent vertical gauging surface of the adjacent bar, and of substantial cross-sectional area. These gauging surfaces may be formed on the sides of inserts 32 of suitable hard metal, received securely in grooves extending along the gauge bars, as will be apparent from Fig. 7. The gauge device 13 thus provides a passage 33 of uniform width, the length of this passage being such that it may simultaneously receive a row of the balls, any ball which is of a diameter less than the passage width passing down between the gauge surfaces 31 into a channel 35 provided in the table 26, while those balls which are larger in diameter than the width of the passage 33 are retained on the gauge bars so they may be subsequently moved to the next gauge device 14 and so on to subsequent gauge devices as will presently be more fully explained.

Extending through the table portion 26, below the series of gauge bars, as an advancing means by which a row of balls is advanced to a gauge device, then lowered onto the gauge device, then lifted from the gauge device and advanced horizontally to the next gauge device. This advancing means is shown as a bar 37 which is automatically moved vertically upwardly, then horizontally towards the right viewed in Fig. 1, then lowered vertically and then returned horizontally to starting position, which is the position shown in Fig. 1. The upper side of this bar has a series of supporting surfaces 38, one for each gauge device, and a series of upward projections 39 which are spaced apart in accordance with the spacing of the successive gauge devices in the direction longitudinally of the series. These upward projections confine a row of the balls moved upwardly from any gauge device and cause the row of balls to be advanced horizontally from one gauge device to the next as the bar 37 moves towards the right as viewed in Fig. 1. The bar 37 in its lowered position is some distance below the passage 33 so that any balls that are smaller in size than the width of the passage move down between the gauge surfaces 31, as the bar descends, and will be propelled laterally from the bar during the descending movements of the bar as these balls engage an inclined surface 40 defining a portion of the channel 35. Any balls that are larger than the passage width will remain suspended by the gauge bars as the advancing bar 37 descends. Then as the advancing bar 37 moves horizontally to the left while out of engagement with the balls on the various gauge devices, and is then raised vertically again, the balls remaining on the gauge devices are raised a little distance above the gauging surfaces of the gauge devices. The following advancing movement of the bar 37 then carries the balls along to the next gauging device rolling along the upper edge of one or the other gauging surfaces of a gauging device and between the inclined surfaces of the gauge devices, as indicated in solid lines in Fig. 7. It will be understood that each gauge device is provided with its own individual channel 35 so that the balls falling through the passage of any gauge device will be segregated from those moving down through other gauge passages. Those balls which are larger in diameter than any of the passages of the gauging devices will finally be moved to the station 22 at the end of the series and pass down through the channel 40.

As the gauge devices provide horizontally extending passages, with horizontal edges forming the upper terminal portions of the gauge surfaces on the gauge bars the balls will not roll along the gauge bars when the bar 37 descends. However the upward projections 39 on the advancing bar 37, and the horizontal flat character of the ball sustaining surfaces between those projections allow free movement of the balls with respect to one another, between any pair of adjacent projections 39, as the bar 37 starts to move horizontally and as it stops its horizontal movement in raised position. The balls passing down through any gauge passage will thus move downwardly at any point along that passage so that a continual wear at only a few localized points along the gauge surfaces 31 will not take place.

The balls are moved from the hopper 11 to a supply station 42 and then to the first gauge device 12 preferably by means operable with or forming part of the bar 37 by means of which the balls are moved from one gauge device to a succeeding device. Thus, as shown in Fig. 1, the end portion 43 of bar 37 has an upward projection 44 which, as shown in Fig. 3, is adapted to pass up through a slot 45 defined by a pair of spaced and laterally adjustable plates 46 arranged below the hopper and below a passageway 47 between laterally adjustable blocks 48, the passageway being wide enough to accommodate balls of the largest diameter to be sorted. When the bar 37 is in its lower position the passageway 47 will be filled with a row of the balls due to the pressure of those balls above. Then when the projection 44 is moved up into the slot 45 and then travels horizontally along the slot, the balls in the slot will be carried upwardly a small distance during the final part of the upward movement of the bar 37, and then moved horizontally towards the supply station 42 which also has a passageway similar to the passageway 47 and wide enough to accommodate the widest balls to be sorted, and which also has a slot similar to the slot 45 and adapted to receive the projection 49 of the bar 37. A series of balls is thus advanced to the supply station and subsequently transferred from the supply station to the gauge device 12.

To prevent the balls from running out of the hopper into the supply station in an uncontrolled manner a partition or gate 50 is adjustably mounted for vertical movement on a side of the hopper 11 and is connected to a post 51 which is operated by a ledge 52 on the side of bar 37 so that as bar 37 moves down the partition gate 50 moves down, and as the bar 37 moves upwardly it moves the gate 50 upwardly. The ledge 52 is of such length as to release the gate 50 just before the bar 37 reaches its extreme right hand position. The gate 50 will be moved out of the way on the balls at a time a series of the balls is being advanced from the hopper to the supply station 42, but is automatically interposed in the opening in the hopper to prevent free movement of the balls along the passage 47 and into the supply station at a time when the bar 37 is in a lower position and the projection 48 moved down out of engagement with the balls.

For moving the bar 37 in rectilinear directions, both vertically and horizontally, there is mechanism contained in the supporting structure and operated by an electric motor 55 having speed reducing gearing contained in the gear box 56 for operating driven shaft 57 at a comparatively slow speed. Shaft 57 is connected by pulley wheel 58 and belt 59 to a pulley wheel 60 on a shaft 61, which is rotatably mounted in bearings 62. On the shaft 61 are two cams 63 and 64. The cam 63 operates against a roller 65 carried at the inner end of a lever 66 which is pivotally supported at 67 on the frame structure and which is pivotally connected at its outer end, at 68, to the lower end of strap 69, pivotally connected in turn at 70, to the end portion of the advancing bar 37. The inner end of the lever 66 is also pivotally connected, with a suitable lost motion to permit the angular movement of this lever, to the inner end of a lever 71, pivotally supported at 72 on a stationary part of the frame. The outer end of the lever 71 is pivotally connected at 73 to a strap 74 which is pivotally connected at its upper end, as indicated at 75, to the opposite end of the bar 37. The levers 71 and 66 are fulcrumed at their middle points so that the straps 74 and 69 will be moved vertically upwardly and downwardly, with equal travel.

The straps 74 and 69 are shown in their lowered position in Fig. 1, the cam position being such as the cam rotates counterclockwise from the position shown, the levers will be tilted to raise the bar 37. When this upward movement of the bar 37 has been completed, the second cam 64 pushes to the left against a roller 78 bearing against the cam and carried by the lower end of a lever 79 pivoted at 80 on the supporting frame. A spring 81 holds the roller 78 against the cam 64. As the lever 79 is turned in a clockwise direction from the position shown in Fig. 1, a pull is exerted on link 82 which is pivotally connected at 83 to the strap 74, so that the bar 37 will be moved to the right to advance the groups of balls from one gauge device to the next subsequent gauge device, and to advance the balls from the hopper towards the first gauge device.

Extending along the side of the table portion 26 and adjacent the ends of the several channels 35 of the several gauge devices, there is a series of cover members 85. These cover members empty into a series of pans or receivers 87, one for each of the channels of the gauge devices so that the balls falling through the passages of the several gauge devices will be sorted or segregated from those passing through the other gauge devices. These pans are normally carried by the supporting structure of the gauge mechanism and are individually removable from the supporting structure merely by lifting upwardly on the outer end of the pan to free its flange 88 from the retaining ledge 89 on the supporting structure, and then pulling outwardly on the pan. As a pan is removed it releases a spring pressed plunger 90, normally pressed outwardly by a spring 91. This plunger 90 is held in retracted position by the upper portion of the inner side of the pan 77 when the pan is in place, but as the pan is removed the restraining influence on the plunger is removed and the plunger moves outwardly and closes a hinged door 92, shown in its normal open position in Fig. 2. A door and spring pressed plunger is provided for each channel 35. When a pan is removed, the end of its respective channel 35 is covered and the balls received in that channel will be retained there until the pan is again inserted in position. As the pan is inserted its inner side moves under the closed door 92 and then engages the projecting end of the plunger 90, the weight of the door then causing the door to swing downwardly and permit the balls in the channel 35 to drop into the pan.

As will now be apparent, the device is adapted for gauging or sorting balls or other articles, and very rapidly sorts large quantities of the articles in accordance with any desired size differential depending upon the adjustment of the gauge bars of the several gauge devices. Balls of different diameter may be sorted, merely by adjustment of the width of the passages of the gauge devices, and the whole row of balls advanced to any gauge device will be simultaneously and similarly subjected to a sorting operation without producing excessive wear on the gauge surfaces themselves at any localized point or points.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Mechanism for gauging and sorting articles according to size comprising a holder for articles to be gauged, a plurality of gauge devices providing successive passages of graduated widths through which the articles of a size less than the passage width may pass, each passage having a uniform width and a length to simultaneously receive a row of the articles, means to simultaneously supply a predetermined number of aligned articles from the holder to the first gauge device, advancing means to lift the articles remaining on a gauge device and move such articles a predetermined distance from one gauge device to the next, and means individual to the gauge devices receiving the articles passing therethrough.

2. Mechanism for gauging and sorting articles according to size comprising a holder for articles to be gauged, a plurality of gauge devices providing successive passages of graduated widths through which the articles of a size less than the passage width may pass, each gauge device comprising a pair of relatively adjustable spaced parallel bars providing a passage having a uniform width and a length to simultaneously receive a row of the articles, means to supply a row of the articles as a group from the holder to the first gauge device, and advancing means to lift a row of articles remaining on a gauge device, move such articles a predetermined distance from one gauge device, and lower the articles on a succeeding gauge device.

3. Mechanism for gauging and sorting articles according to size comprising a plurality of gauge devices providing successive passages of graduated widths through which articles of a size less than the passage width may pass, each gauge device comprising a pair of relatively adjustable spaced parallel bars providing a passage having a uniform width and a length to simultaneously receive a row of the articles, means for supplying a row of the articles as a group to the first gauge device, advancing means to lift a row of articles remaining on a gauge device, move such articles a predetermined distance from one gauge device and lower the articles on a succeeding gauge device, a common supporting member extending longitudinally of the series of gauge devices, on which the gauge devices are mounted, and having a vertical slot guiding the article moving means and having a series of channels extending laterally of the slot and provided with stationary wall portions against which the articles lowered with the advancing means through the gauge passages are contacted to remove such articles from the advancing means, and means for driving said advancing means to move it vertically upwardly and then horizontally to provide the lifting and moving operation.

4. Mechanism for gauging and sorting articles according to size comprising a holder for articles to be gauged, a plurality of gauge devices providing successive passages of graduated widths through which articles of a size less than the passage width may pass, each gauge device comprising a pair of relatively adjustable spaced horizontal bars providing a passage having a uniform width and a length to simultaneously receive a row of the articles, means to supply a row of the articles from the holder to the first gauge device, and a common advancing means to lift a row of articles remaining on gauge device, move such articles a predetermined distance from one gauge device and lower the articles on a succeeding gauge device, said advancing means having upward projections defining the length of the row of articles received thereby and providing freedom of movement of the articles thereon between adjacent projections.

5. Mechanism for gauging and sorting articles according to size comprising a holder for articles to be gauged, a plurality of gauge devices providing successive passages of graduated widths through which the articles of a size less than the passage width may pass, each gauge device comprising a pair of relatively adjustable spaced parallel horizontal bars each having a vertical gauging surface of substantial area and providing a passage having a uniform width and a length to simultaneously receive a row of the articles, and an advancing bar for simultaneously supplying a row of the articles from the holder to the first gauge device and from each gauging device to a succeeding gauge device while affording freedom of movement of the articles in the direction of the length of the rows as the articles are advanced and lowered by the advancing bar, and means for operating said advancing bar.

6. Mechanism for gauging and sorting articles according to size comprising a holder for articles to be gauged, a plurality of gauge devices providing successive passages of graduated widths through which the articles of a size less than the passage width may pass, each passage having a uniform width and a length to simultaneously receive a row of the articles, a common support for said gauge devices having a slot below the holder and having a channel below the gauge devices and in line with the slot, means operable in said slot and channel and having projections spaced apart several times the width of a gauge passage and extending, at times, into the passages of the gauge devices to supply a row of the articles from the holder to the first gauge device and from each gauge device to a succeeding gauge device, said means having horizontally extending portions between adjacent projections and means for operating said last named means successively vertically upwardly, then horizontally in one direction, then vertically downwardly, and then horizontally in the opposite direction.

7. Mechanism for gauging and sorting articles according to size comprising a hopper for articles to be gauged, a plurality of gauge devices providing successive passages of graduated widths through which articles of a size less than the passage width may pass, each passage having a uniform width and a length to simultaneously receive a row of the articles, means for advancing a row of the articles from the hopper to the first gauge device and for lifting the articles on the gauge devices and advancing them to a succeeding gauge device, and means adjacent a wall of the hopper connected to the advancing means and operable in timed relation with said advancing means to prevent movement of the articles from the hopper except as controlled by said advancing means.

8. Mechanism for gauging and sorting articles according to size comprising a hopper for articles to be gauged, a plurality of gauge devices providing successive passages of graduated widths through which articles of a size less than the passage width may pass, each passage having a uniform width and a length to simultaneously receive a row of the articles, a supply station between the hopper and the first gauge device, means for advancing a row of the articles from the hopper to the supply station, means for lifting a row of the articles from the supply station and advancing the same to the first gauge device and for lifting the articles on the gauge devices and advancing them to a succeeding gauge device, means between the hopper and the supply station and having a lost motion connection to the advancing means and preventing movement of the articles from the hopper except as controlled by said advancing means, and means individual to each gauge device receiving the articles passing therethrough.

9. Mechanism for gauging and sorting balls according to diameter comprising a plurality of gauge devices arranged in line and providing successive aligned passages of graduated widths through which balls of a diameter less than the passage width may pass, each gauge device comprising a pair of relatively adjustable spaced parallel bars providing a passage having a uniform width and a length to simultaneously receive a row of the balls, an advancing bar for lifting a row of balls from one gauge device and advancing them to a succeeding gauge device, said advancing bar having regularly spaced upward projections limiting the length of the row of balls lifted from the gauge devices and having horizontal surfaces between adjacent projections on which the balls have freedom of motion, the parallel bars of each gauge device having vertically extending parallel gauging surfaces of substantial height which meet adjacent inclined surfaces for guiding the balls as they are advanced.

10. Mechanism for gauging and sorting articles comprising a holder for articles to be gauged, a plurality of gauge devices providing successive passages of graduated widths through which the articles of a size less than the passage width may pass, each gauge device comprising a pair of relatively adjustable spaced parallel bars providing a passage having a uniform width and a length to simultaneously receive a row of the articles, means to supply a row of the articles from the holder to the first gauge device, advancing means to lift the row of articles remaining on a gauge device, move such articles a predetermined distance from one gauge device and lower the articles on a succeeding gauge device, said advancing means having horizontally extending article supporting portions providing freedom of movement of the articles of a row between predetermined limits, a common support for said gauge devices, and means on said support for laterally moving the articles passing through a gauge device from said advancing means.

11. Mechanism for gauging and sorting articles according to size comprising a holder for articles to be gauged, a plurality of gauge devices providing successive passages of graduated widths through which the articles of a size less than the passage width may pass, each gauge device comprising a pair of relatively adjustable spaced parallel bars having vertical gauging surfaces and providing a passage having a uniform width and a length sufficient to accommodate a row of the articles, means for simultaneously supplying a row of articles from the holder to the first gauge device and for lifting a row of articles remaining on the several gauge devices and moving such rows simultaneously a predetermined distance from one gauge device to a succeeding gauge device, said advancing means having horizontal article supporting portions providing freedom of movement of a number of articles thereon between predetermined limits as the articles are moved thereby.

WILLIS FAY ALLER.